United States Patent [19]
Santa Cruz et al.

[11] Patent Number: 6,086,036
[45] Date of Patent: Jul. 11, 2000

[54] VEHICLE EMERGENCY AUXILIARY BY-PASS DEVICE

[76] Inventors: Cathy D. Santa Cruz, 401 Canyon Way, #43, Sparks, Nev. 89434; Gary McCullough, 325 W. Hwy. 20, Upper Lake, Calif. 95485

[21] Appl. No.: 09/098,392

[22] Filed: Jun. 16, 1998

[51] Int. Cl.[7] .............................. F16H 7/12; F16M 1/00; F16M 3/00
[52] U.S. Cl. ......................... 248/674; 474/136; 474/137
[58] Field of Search ................................. 248/200, 674; 474/148, 150, 101, 136, 137

[56] References Cited

U.S. PATENT DOCUMENTS

| | | | |
|---|---|---|---|
| 97,955 | 11/1869 | Myers | 474/136 |
| 122,932 | 1/1872 | Batcheller | 474/136 |
| 209,125 | 10/1878 | Katen | 474/136 |
| 1,571,153 | 1/1926 | Wright | 474/137 X |
| 1,767,010 | 6/1930 | Nielsen | 474/136 X |
| 1,803,186 | 4/1931 | Hendrickson | 474/137 X |
| 4,726,557 | 2/1988 | Heurich et al. | 474/136 X |
| 4,735,599 | 4/1988 | Leonard | 474/101 |
| 4,892,508 | 1/1990 | Ryan et al. | 474/101 |

*Primary Examiner*—Leslie A. Braun
*Assistant Examiner*—Jon A Szumny

[57] ABSTRACT

Herein disclosed is an emergency bracket which is attachable to a support surface of choice and may be temporarily used to by-pass a defective auxiliary unit, such as an alternator, or the like.

3 Claims, 3 Drawing Sheets

VEHICLE EMERGENCY AUXILIARY BY-PASS DEVICE

FIELD OF THE INVENTION

This invention relates to emergency devices that may be used when an auxiliary unit, such as an alternator, or the like, has become inoperable. But more particularly relates to a removable adjustable bracket which applies tension to the existing drive belt, and allows the user to temporarily drive the vehicle until the vehicle can be serviced.

BACKGROUND OF THE INVENTION

Vehicle drive belts are very well known in the automotive industry, and are typically used to drive auxiliary devices such as an alternator, an air-conditioner pumps, a power steering pumps etc. Unfortunately, when an auxiliary device driven by the belt becomes inoperable, the drive belt can no longer function properly. Thus, the driver and vehicle are completely stranded if a service station is not accessible. This can be very life threatening, especially when the vehicle is a four-wheel drive, and the driver has traveled into a very remote area where help is simply not possible.

Therefore, it is contended by the applicants, if the driver of a vehicle were to have immediate access to an emergency bracket that allows the user to temporarily drive the vehicle when an auxiliary unit driven by the drive belt fails, this would be highly advantageous. Whereby, allowing the driver to operate the vehicle until the vehicle can be serviced.

SUMMARY OF THE INVENTION

It is therefore an object of the present invention to provide an emergency bracket which can temporarily by-pass an existing auxiliary unit, such as an alternator, that is driven by a typical drive belt.

It is a further object of the present invention to provide an emergency bracket that can be easily installed, within substantially any vehicle of choice.

Still a further object of the present invention is to provide an emergency bracket that is of simple construction, and is easily attached using minimal parts.

Yet another object of the present invention is to provide an emergency bracket that is economical to manufacture.

A further object of the present invention is to provide a bracket which can be formed from substantially any suitable material of engineering choice, such as stainless steel, or the like.

Still a further object of the present invention is to provide a bracket which can be installed at substantially any desirable location of user choice within the engine compartment, or the like.

Yet another object of the present invention is to provide a bracket that allows the user to position the drive belt thereon in multiple positions of choice. Thus, allowing the user to apply various adjustable tension on the belt.

Also, another object of the present invention is to provide a bracket which may include at least one V-shaped protuberance thereon, which is of a shape and size to engage a tooth on a V-ribbed pulley, such as found on an alternator.

Still a further object of the present invention is to provide a bracket which when installed, allows the user to by-pass the normal belt tensioner if so desired.

Other objects and advantages will become apparent when taken into consideration with the following specification and drawings.

DETAILED DESCRIPTION OF THE DRAWINGS

Figure 1:
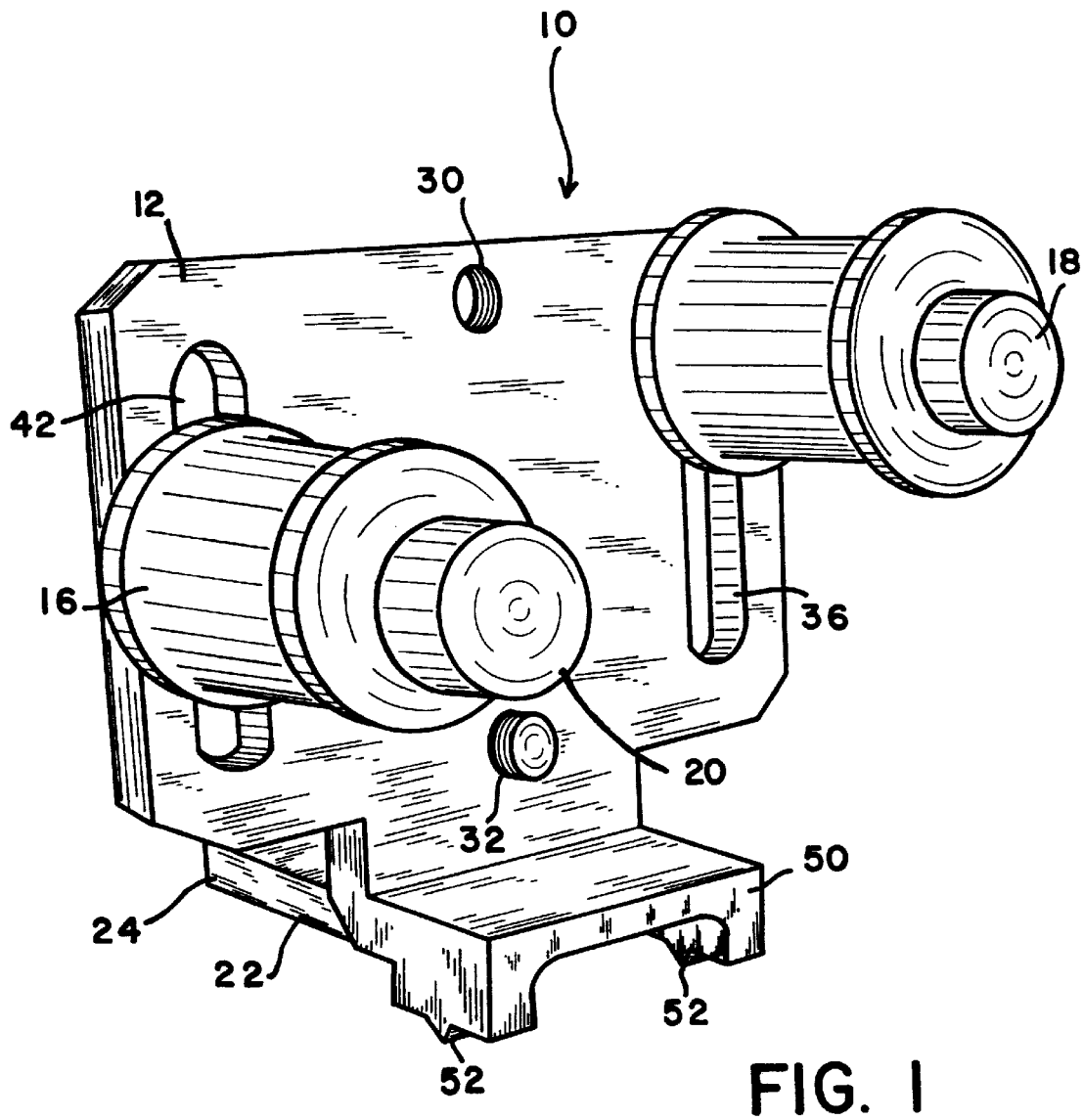
FIG. 1 is substantially a perspective frontal view of the preferred embodiment for the present invention.
Figure 2:
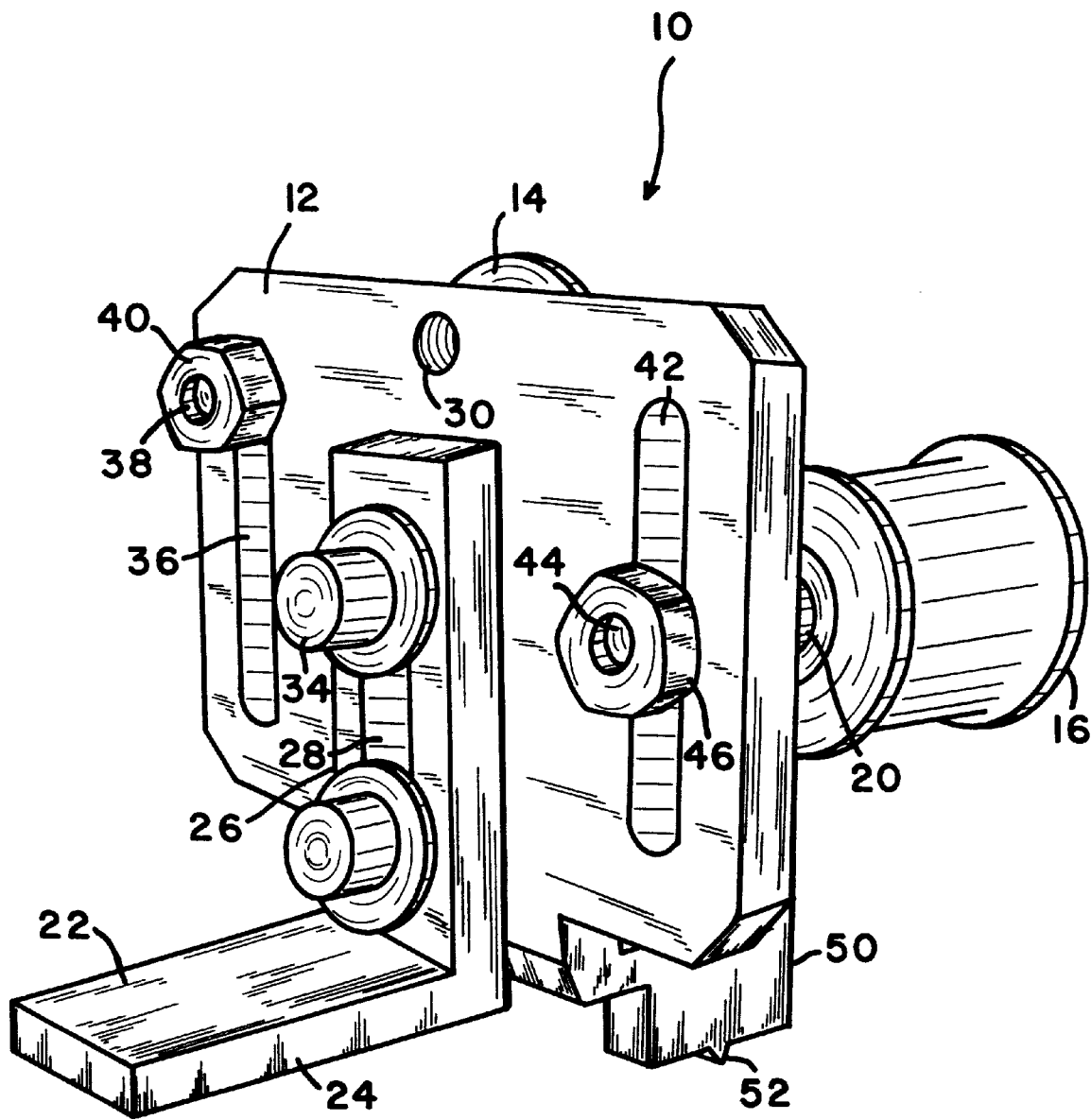
FIG. 2 is substantially a perspective backside view of the preferred embodiment of FIG. 1.
Figure 3:
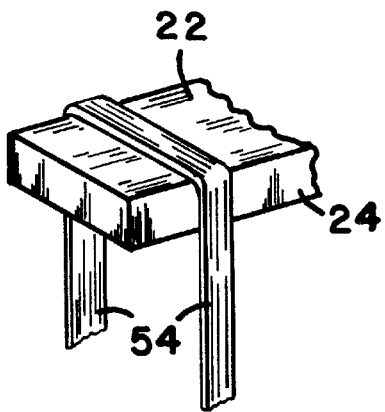
FIG. 3 is substantially a partial view showing an L-shaped bracket and a prior art hose clamp.
Figure 4:
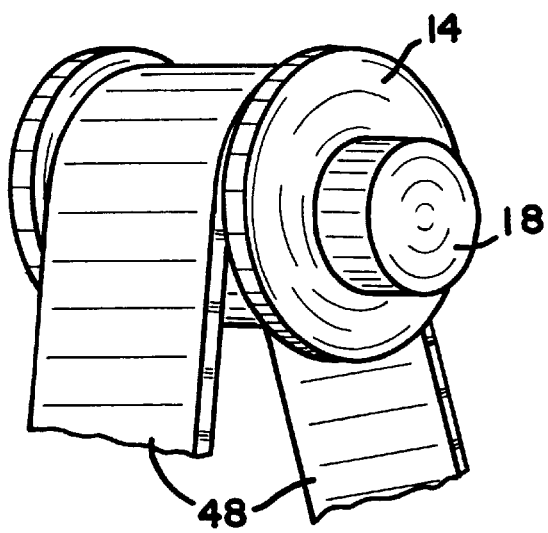
FIG. 4 is substantially a partial view showing a rotating member with a prior art drive belt positioned thereon.

Referring now to the drawings wherein like characters refer to like elements throughout the various views. Within FIGS. 1 & 2, (arrow 10) represents an overview for the present invention which is substantially a vehicle emergency auxiliary by-pass device.

It is to be noted various embodiments for the present invention may be produced, thus, the device is not to be limited to the embodiments as shown herein. For example, in FIGS. 1 & 2, device (arrow 10) includes a bracket (12), a first circular rotating member (14), a second rotating member (16), a first elongated member (18), and a second elongated member (20).

Referring now to bracket (12) which can be made from substantially any suitable material of choice, such as stainless steel, or the like. Furthermore, bracket (12) may be formed into substantially any suitable shape or size of engineering choice.

Bracket (12) includes attachment means for removably adjustably attaching bracket (12) to any suitable fixed support structure of choice, such as on the side wall found within an engine compartment, or on an auxiliary device, such as on an alternator, or the like. It is to be noted that any suitable attachment means of engineering choice may be used. For example, we provide an L-shaped member (22) having a short leg (24), and a long leg (26), with long leg (26) having an elongated slot (28), and bracket (12) having at least one threaded bore (30) there through which is in open communication with slot (28). The attachment means further includes at least one threaded member (32) which is of a size and length to extend into slot (28) and out of bore (30). After L-shaped member (22) is adjustably positioned into the location of choice, threaded member (32) is then adjustably secured at the desired location by any suitable fastener of choice, such as an end nut (34), or the like.

It will now be seen that L-shaped member (22) is adjustable between various positions of choice, and further allows bracket (12) to be adjustably attached at various angles upon substantially any suitable support structure of choice.

First elongated member (18) having attachment means for removably attaching first elongated member (18) to bracket (12). It is to be noted any suitable attachment means of engineering choice may be used. For example, bracket (12) may include a first elongated slot (36) and first elongated member (18) may include a threaded end (38). With first elongated member (18) being of a length to extend through first rotating member (14) into and through out first slot (36), and threaded end (38) may be secured at a desired location by any suitable fastener of engineering choice, such as by a first nut (40). It is to be noted that if so desired, first elongated member (18) may be a typical prior art shoulder bolt.

Second elongated member (20) also includes attachment means for removably attaching second elongated member (20) to bracket (12). It is to be noted any suitable attachment means of engineering choice may be used. For example, bracket (12) may include a second elongated slot (42) and second elongated member (20) may include a threaded end (44). With second elongated member (20) being of a length to extend through second rotating member (16) into and through out second slot (42), and threaded end (44) may be secured at a desired location by any suitable fastener of engineering choice, such as by a second nut (46). It is to be noted that if so desired, second elongated member (20) may also be a typical prior art shoulder bolt. Therefore, it will now be seen that each elongated member (18 & 20) and each rotating member (14 & 16) are adjustable between various positions of choice.

It is to be further noted that first rotating member (14) is of a shape and size to slidably receive first elongated member (18) there through, and second rotating member (16) is of a shape and size to slidably receive second elongated member (20) there through. Also, first rotating member (14) is of a shape and size to removably accept and support an auxiliary drive belt (48) thereon, and second rotating member (16) is of a shape and size to removably accept and support auxiliary drive belt (48) thereon. Therefore, when first rotating member (14) and second rotating member (16) are adjustably secured on bracket (12), and each rotating member (14 & 16) are adjustably positioned at a location of choice, each rotating member (14 & 16) and bracket (12) cooperate together to temporarily by-pass a defective auxiliary item in an adjustable manner.

It is to be further noted that any auxiliary item of choice may be by-passed, such as an alternator, an air-conditioning pump, a power steering pump, etc.

It is to be further noted that if so desired, bracket (12) may include a protruding flange (50) having at least one or two substantially V-shaped protuberances (52) thereon, and protuberances (52) are each of a shape and size to engage a tooth on a V-ribbed pulley, such as used with an alternator.

Still further, it is to be noted that if so desired, flange (50) may be removably adjustably attached to a defective auxiliary item, such as an alternator, by at least one hose clamp (54), or the like.

As previously noted, the present device (arrow 10) may include only one rotating member, either (14 or 16), and only one elongated member, either (18 or 20), depending on engineering choice. Whereby, device (arrow 10) is functional for temporarily by-passing a defective auxiliary item.

We herein further provide a method of using a vehicle emergency auxiliary by-pass device (arrow 10) including the following steps of:

a. determining which auxiliary device operated by a drive belt (48) is defective;
 b. loosening drive belt (48) until slack in drive belt (48) is achieved; R
 c. positioning by-pass device (arrow 10) at a location of choice;
 d. attaching by-pass device (arrow 10) with suitable attachment means;
 e. positioning drive belt (48) over at least a first rotating member (14) on by-pass device (arrow 10); and;
 f. positioning first rotating member (14) at a location of choice, which applies the desired tension upon said belt.

It is to be noted if so desired, the use of the preexisting prior art tensioner may be by-passed as well.

Although the invention has been herein shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus's.

Having described our invention, what we claim as new and wish to secure by Letters Patent is:

1. A vehicle emergency auxiliary by-pass device comprising: a bracket; a circular rotating member; and an elongated member; said bracket having first and second attachment means for removably adjustably attaching said bracket to a fixed support structure, said elongated member having attachment means for removably attaching said elongated member to said bracket, said rotating member being adapted to removably accept and support an auxiliary drive belt thereon; said first attachment means being an L-shaped member having a short leg and a long leg, said long leg having a first elongated slot, said bracket having at least one threaded bore there through, said bore and said first slot being in open communication, at least one threaded member being of a length to extend into said first slot and out of said bore, said threaded member being slidable between various positions within said first slot, and when said threaded member is positioned at a desired location within said first slot, said threaded member is secured by a first nut, said second attachment means includes a second elongated slot in said bracket, said elongated member having a threaded end, said elongated member being of a length to extend through said second slot, said elongated member being slidable between various positions within said second slot, and when said elongated member is positioned at a desired location within said second slot, said elongated member is secured by a second nut, whereby:
 said L-shaped member is adjustable between various positions relative to said bracket depending on where said first nut is secured, and said elongated member with said rotating member attached thereto are adjustable between various positions depending on where said second nut is secured, whereby:
 such that said by-pass device is functional for temporarily receiving a re-routed auxiliary drive belt on said rotating member from a defective auxiliary item, thereby by-passing said auxiliary item.

2. The auxiliary by-pass device of claim 1 further including a second circular rotating member, a second elongated member, and said bracket includes a third elongated slot, said second elongated member having a threaded end, said second elongated member being of a length to extend through said second rotating member into said third elongated slot, said second elongated member being slidable between various positions within said third elongated slot, and when said second threaded member is positioned at the desired location within said third elongated slot, said second elongated member is secured by a third nut, whereby:
 said second elongated member with said second rotating member attached thereto are adjustable between various positions relative to said bracket depending on where said third nut is secured.

3. A method of using a vehicle emergency auxiliary by-pass device comprising the steps of:

a. determining which auxiliary device operated by a drive belt is defective;

b. loosening said drive belt until slack in said drive belt is achieved;

c. removing said drive belt from a pulley on said auxiliary device;

d. positioning said by-pass device onto a support structure;

e. attaching said by-pass device to said support structure with attachment means;

f. positioning said drive belt over at least a first rotating member adjustably mounted on said by-pass device; and g. adjusting said rotating member on said by-pass device, thereby positioning said first rotating member at a location to apply a desired tension upon said belt.

* * * * *